US012116912B2

(12) United States Patent
Barnes et al.

(10) Patent No.: US 12,116,912 B2
(45) Date of Patent: Oct. 15, 2024

(54) CONTAINER, METHOD AND CONTROL SYSTEM

(71) Applicant: Castrol Limited, Reading (GB)

(72) Inventors: Andrew Phillip Barnes, Norfolk (GB); Peter Stuart Brett, Berkshire (GB); Steven Paul Goodier, Oxfordshire (GB); Mark O'Malley, Suffolk (GB)

(73) Assignee: Castrol Limited, Reading (GB)

( * ) Notice: Subject to any disclaimer, the term of this patent is extended or adjusted under 35 U.S.C. 154(b) by 0 days.

(21) Appl. No.: 17/720,289

(22) Filed: Apr. 13, 2022

(65) Prior Publication Data

US 2023/0064588 A1 Mar. 2, 2023

Related U.S. Application Data

(63) Continuation of application No. 14/443,608, filed as application No. PCT/EP2013/074209 on Nov. 19, 2013, now abandoned.

(30) Foreign Application Priority Data

Nov. 19, 2012 (EP) ..................................... 12193246
Feb. 28, 2013 (EP) ..................................... 13157211

(51) Int. Cl.
*F01M 11/04* (2006.01)
*B60R 16/023* (2006.01)
*F01M 1/18* (2006.01)

(52) U.S. Cl.
CPC ......... *F01M 11/04* (2013.01); *B60R 16/0231* (2013.01); *F01M 1/18* (2013.01); *F01M 2011/0483* (2013.01)

(58) Field of Classification Search
CPC ............... B60R 16/0231; B60R 16/08; B60K 2015/03184; B60K 2015/03197; F02M 37/0082; F01M 1/18; F01M 11/04; F01M 2011/0483
See application file for complete search history.

(56) References Cited

U.S. PATENT DOCUMENTS 3,336,223 A 8/1967 Kneeland
3,399,776 A 9/1968 Knuth
(Continued)

FOREIGN PATENT DOCUMENTS

CN 1091177 8/1994
CN 1160135 8/2004
(Continued)

*Primary Examiner* — Phutthiwat Wongwian
*Assistant Examiner* — Diem T Tran
(74) *Attorney, Agent, or Firm* — McDonnell Boehnen Hulbert & Berghoff LLP

(57) ABSTRACT

A replaceable fluid container for an engine comprising: a reservoir for holding a fluid; a fluid coupling adapted to provide fluidic communication between the reservoir and a fluid circulation system of an engine; and a data provider arranged such that positioning the container to permit fluidic communication between the reservoir and the fluid circulation system of the engine arranges the data provider for data communication with an engine control device of the engine. There is also provided a method of facilitating control of an engine and an engine control system, apparatus and a vehicle.

23 Claims, 3 Drawing Sheets

(56) References Cited

U.S. PATENT DOCUMENTS

| | | | |
|---|---|---|---|
| 3,447,636 A * | 6/1969 | Bonfilio | F01M 11/0458 |
| | | | 123/196 R |
| 4,075,097 A | 2/1978 | Paul | |
| 4,075,098 A | 2/1978 | Paul et al. | |
| 4,144,166 A | 3/1979 | DeJovine | |
| 4,151,823 A * | 5/1979 | Grosse | F01M 11/03 |
| | | | 210/167.02 |
| 4,237,838 A * | 12/1980 | Kinugawa | F02M 69/32 |
| | | | 123/339.22 |
| 4,265,748 A | 5/1981 | Villiani et al. | |
| 4,327,262 A | 4/1982 | Kull | |
| 4,406,784 A | 9/1983 | Cochran | |
| 4,615,305 A | 10/1986 | Matsumoto | |
| 4,755,289 A | 7/1988 | Villiani | |
| 4,847,768 A | 7/1989 | Schwartz et al. | |
| 5,273,085 A | 12/1993 | Edwards et al. | |
| 5,327,861 A | 7/1994 | Rogalia et al. | |
| 5,454,354 A | 10/1995 | Miller | |
| 5,552,040 A | 9/1996 | Baehler et al. | |
| 5,567,342 A | 10/1996 | Inoue et al. | |
| 5,591,330 A | 1/1997 | Lefebvre | |
| 5,640,936 A | 6/1997 | Hudson | |
| 5,669,464 A * | 9/1997 | Earleson | F01M 1/12 |
| | | | 123/196 S |
| 5,676,842 A * | 10/1997 | Bedi | F01M 11/0458 |
| | | | 210/171 |
| 5,701,862 A | 12/1997 | Inoue et al. | |
| 5,725,031 A | 3/1998 | Bilski et al. | |
| 5,871,068 A | 2/1999 | Selby | |
| 6,045,692 A | 4/2000 | Bilski et al. | |
| 6,048,454 A | 4/2000 | Jenkins | |
| 6,161,510 A | 12/2000 | Ishikawa et al. | |
| 6,172,602 B1 | 1/2001 | Hasfjord | |
| 6,196,057 B1 | 3/2001 | Discenzo | |
| 6,348,149 B1 | 2/2002 | Jenkins | |
| 6,374,797 B1 | 4/2002 | Fischer | |
| 6,793,818 B1 | 9/2004 | Entringer et al. | |
| 6,938,585 B2 | 9/2005 | Schneider | |
| 7,124,729 B2 | 10/2006 | Caracciolo | |
| 7,370,514 B2 | 5/2008 | Halalay et al. | |
| 7,581,434 B1 | 9/2009 | Discenzo et al. | |
| 7,713,425 B2 | 5/2010 | Hanson et al. | |
| 8,061,383 B2 | 11/2011 | Gouzou et al. | |
| 8,165,831 B2 | 4/2012 | Matsunaga et al. | |
| 8,327,818 B2 | 12/2012 | Jefferies et al. | |
| 8,783,214 B2 | 7/2014 | Sachdev et al. | |
| 9,869,219 B2 | 1/2018 | Barnes et al. | |
| 9,878,822 B2 | 1/2018 | Barnes et al. | |
| 9,890,901 B2 | 2/2018 | Brett et al. | |
| 9,938,867 B2 | 4/2018 | Brett et al. | |
| 2004/0079589 A1 | 4/2004 | Schneider | |
| 2005/0118468 A1 * | 6/2005 | Adams | H01M 8/1011 |
| | | | 429/432 |
| 2005/0161628 A1 | 7/2005 | Tiberghien et al. | |
| 2006/0254986 A1 | 11/2006 | Hanson et al. | |
| 2007/0050095 A1 | 3/2007 | Nelson | |
| 2007/0113921 A1 * | 5/2007 | Capizzo | B60L 53/80 |
| | | | 141/231 |
| 2007/0272217 A1 * | 11/2007 | Kubota | F02M 37/0029 |
| | | | 123/457 |
| 2008/0088127 A1 | 4/2008 | Tiberghien | |
| 2008/0179139 A1 | 7/2008 | Montgomery | |
| 2008/0265574 A1 | 10/2008 | Tiberghien et al. | |
| 2008/0302606 A1 | 12/2008 | Alston | |
| 2009/0206024 A1 | 8/2009 | Bilski | |
| 2009/0211552 A1 | 8/2009 | Prior et al. | |
| 2009/0303466 A1 * | 12/2009 | Arakawa | F02D 33/006 |
| | | | 73/114.54 |
| 2010/0036583 A1 * | 2/2010 | Vestrini | F02D 19/061 |
| | | | 701/103 |
| 2010/0043755 A1 * | 2/2010 | Nishibu | F02M 37/0023 |
| | | | 123/459 |
| 2010/0126251 A1 | 5/2010 | Pileggi et al. | |
| 2010/0228400 A1 | 9/2010 | Johnson et al. | |
| 2010/0307460 A1 * | 12/2010 | Matsuki | F02M 59/102 |
| | | | 123/511 |
| 2010/0320014 A1 * | 12/2010 | Woody | B60L 50/00 |
| | | | 361/689 |
| 2011/0041796 A1 | 2/2011 | Sachdev et al. | |
| 2011/0048857 A1 | 3/2011 | McGilvary et al. | |
| 2011/0253092 A1 | 10/2011 | Springer et al. | |
| 2012/0265429 A1 * | 10/2012 | Perera | F02M 37/0082 |
| | | | 701/123 |
| 2013/0224617 A1 * | 8/2013 | Haastert | B01J 47/024 |
| | | | 429/434 |
| 2013/0239845 A1 * | 9/2013 | Frazier | B61C 3/00 |
| | | | 105/27 |
| 2014/0159364 A1 * | 6/2014 | Harris | F02G 5/02 |
| | | | 290/2 |
| 2014/0331746 A1 | 11/2014 | Ito | |
| 2015/0291133 A1 * | 10/2015 | Hidalgo Balboa | B60K 15/067 |
| | | | 414/573 |
| 2017/0089234 A1 | 3/2017 | Dawson et al. | |
| 2017/0089235 A1 | 3/2017 | Dawson et al. | |
| 2017/0101911 A1 | 4/2017 | Barnes et al. | |
| 2017/0107873 A1 | 4/2017 | Ali et al. | |
| 2017/0122151 A1 | 5/2017 | Brett et al. | |
| 2017/0183992 A1 | 6/2017 | Barnes et al. | |
| 2017/0190466 A1 | 7/2017 | Andersen et al. | |
| 2017/0197596 A1 | 7/2017 | Barnes et al. | |

FOREIGN PATENT DOCUMENTS

| | | |
|---|---|---|
| CN | 1965151 | 5/2007 |
| CN | 101115911 | 1/2008 |
| CN | 101421165 | 4/2009 |
| CN | 101256634 | 9/2009 |
| CN | 101994542 | 3/2011 |
| CN | 202991173 | 6/2013 |
| DE | 29513959 | 1/1997 |
| DE | 10136971 | 2/2003 |
| DE | 102011001739 | 10/2012 |
| DE | 102012024365 | 6/2014 |
| EP | 0 661 429 B1 | 10/1996 |
| JP | H06-007710 | 1/1984 |
| JP | 61-003942 U | 1/1986 |
| JP | H06-159031 | 6/1994 |
| JP | H09-329011 | 12/1997 |
| JP | H10-131801 | 5/1998 |
| JP | H11-286121 | 10/1999 |
| JP | 2000-130240 | 5/2000 |
| JP | 2001-254893 | 9/2001 |
| JP | 2002212974 A * | 7/2002 |
| JP | 2003049996 | 2/2003 |
| JP | 2003-312795 | 11/2003 |
| JP | 2004-156455 | 6/2004 |
| JP | 2004-338122 | 12/2004 |
| JP | 2005-091360 | 4/2005 |
| JP | 2005-178899 | 7/2005 |
| JP | 2005-201219 | 7/2005 |
| JP | 2005-307987 | 11/2005 |
| JP | 2007042497 | 2/2007 |
| JP | 2008121468 | 5/2008 |
| JP | 2009-196201 | 9/2009 |
| JP | 2009-214003 | 9/2009 |
| JP | 2009-228636 | 10/2009 |
| JP | 2010-188823 | 9/2010 |
| JP | 2010-244092 | 10/2010 |
| JP | 2011-179339 | 9/2011 |
| JP | 2012-120223 | 6/2012 |
| JP | 2012-148514 | 8/2012 |
| JP | 2014-084734 | 5/2014 |
| KR | 1020030050005 | 4/2005 |
| WO | WO 01/053663 | 7/2001 |
| WO | WO 03/072912 | 9/2003 |
| WO | WO 2005/088084 | 9/2005 |
| WO | WO 2007/011882 | 1/2007 |
| WO | WO 2008/001574 | 1/2008 |
| WO | WO 2010/026559 | 3/2010 |
| WO | WO2011/064903 | 4/2013 |

(56) References Cited

FOREIGN PATENT DOCUMENTS

| WO | WO 2013/057768 | 4/2015 |
|----|----|----|
| WO | WO 2016/158971 | 10/2016 |

* cited by examiner

CONTAINER, METHOD AND CONTROL SYSTEM

This application is a continuation of U.S. application Ser. No. 14/443,608, filed May 18, 2015, which in turn is the U.S. National Phase of International Application No. PCT/EP2013/074209, filed Nov. 19, 2013, which designated the U.S. and claims priority to European Patent Application No. 12193246.1, filed Nov. 19, 2012, and European Patent Application No. 13157211.7, filed Feb. 28, 2013, each of which are hereby incorporated by reference in their entirety.

This invention relates to a container, method and control system and in particular to a fluid container for an engine, a method of facilitating control of an engine and/or vehicle comprising a fluid circulation system and to a control system, as well as to an apparatus and a vehicle.

Many vehicle engines use one or more fluids for their operation. Such fluids are often liquids. For example, internal combustion engines use liquid lubricating oil compositions. Also, electric engines use heat exchange liquids for example to cool the engine, to heat the engine or to cool and heat the engine during different operating conditions. Such fluids are generally held in reservoirs associated with the engine.

Particular engines may be designed to operate with particular fluids.

WO 01/53663 describes a removable and disposable oil cartridge device linked to an internal combustion engine regulating interface for manually filling or emptying and automatically regulating the engine lubricating oil. WO 01/53663 describes a continuous sensing system concerning the oil level in the engine crankcase.

US 2007/0050095 describes an engine management system.

There remains a need for a replaceable fluid container for an engine, for example a vehicle engine which seeks to avoid or at least mitigate problems such as inappropriate use of components or incorrectly fitting of components when replenishing/replacing a fluid supply to an engine.

In an aspect of the present invention there is provided a replaceable fluid container for an engine comprising: a reservoir for holding a fluid; a fluid coupling adapted to provide fluidic communication between the reservoir and a fluid circulation system of an engine; and a data provider arranged such that positioning the container to permit fluidic communication between the reservoir and the fluid circulation system of the engine arranges the data provider for data communication with an engine control device of the engine.

This and other aspects of the disclosure enable operation of the engine to be inhibited where a fluid container has not been properly coupled in fluidic communication with the fluid circulation system of an engine.

According to another aspect of the present invention there is also provided a computer implemented method of facilitating control of an engine, the method comprising: receiving, at a fluid container, a signal indicating that the fluid container is coupled to the engine; in response to the received signal performing an action selected from the list consisting of: providing data to an engine control device; and, providing data to a memory at the fluid container.

This and other aspects enable engine fluids to be easily replaced for example by a consumer whilst reducing the risk that consumers will use inappropriate fluids and/or enabling the use of the container to be recorded for example at an engine control device and/or at the container, to inform for example, subsequent diagnostics and maintenance.

In another aspect of the present invention there is also provided a replaceable fluid container for an engine comprising: a reservoir for holding a fluid; at least one self-sealing coupling adapted to connect said reservoir in fluidic communication with a fluid circulation system of an engine and a data module adapted to communicate data with an engine control device when the reservoir is in fluidic communication with said fluid circulation system.

Communication of data may comprise one of: providing data to the control device; and receiving data from the control device. The data provider may be arranged to inhibit communication with the control device unless the reservoir is in fluidic communication with the fluid circulation system. The data provider may be arranged such that positioning the container to permit fluidic communication with the fluid circulation system also couples the data provider in data communication with the control device. The container may be configured so that arranging the container to permit fluid communication enables the data provider to be connected for communication with the engine. This connection may be provided by the arrangement of the container but may also require some additional further action to make the connection, such as throwing a switch.

These and other examples of the disclosure may provide an interlock to inhibit operation of an engine unless a selected type of fluid container has been correctly coupled to the engine.

Arranging the container to permit fluidic communication may comprise connecting the reservoir in fluidic communication with the fluid circulation system via the fluid coupling. The fluid coupling may comprise a self-sealing coupling arranged such that connecting the self-sealing coupling to the fluid circulation system arranges the data provider for communicating data with the control device. The data provider may be operable to communicate by at least one of: providing data to the control device; and receiving data from the control device. The data provider may be configured to communicate with the control device in response to the fluid coupling being coupled to the fluid circulation system. The data may comprise at least one property of the fluid in the reservoir of the container.

The container may comprise a sensor adapted to sense at least one property of a fluid in the reservoir of the container and the data provided to the control device may comprise data based on the sensed property of the fluid. The sensed property of the fluid may be at least one property selected from the group consisting of: the amount of fluid, the temperature of fluid, the pressure of fluid, the viscosity of fluid, the density of fluid, the electrical resistance of fluid, the dielectric constant of fluid, the opacity of fluid, the chemical composition of fluid and combinations of two or more thereof. The amount of fluid includes the absence of the fluid. Thus, the sensor may sense that there is no fluid in the reservoir and the data provided to the control device comprises data based on at least one sensed property which includes the absence of fluid in the reservoir of the container.

The data provider may comprise at least one printed circuit board (sometimes called a PCB). In some examples the PCB is adapted to communicate with the control device through electrical contacts on the replaceable container adapted to engage corresponding contacts on or associated with the engine.

The data provider may comprise at least one computer readable identifier for identifying the fluid, the identifier may be an electronic identifier, such as a PCB, a near field RF communicator, for example a passive or active RFID tag, or an NFC communicator. RF stands for radio Frequency.

RFID stands for Radio Frequency IDentification. NFC stands for Near Field Communication. The computer readable identifier may be an optical identifier, such as a barcode, for example a two-dimensional barcode, or a colour coded marker, or optical identifier on the container. The computer readable identifier may be provided by a shape or configuration of the container.

The data provider may comprise at least one a memory. The memory may store data comprising at least one property of the fluid selected from the group consisting of: the amount of fluid, the temperature of fluid, the pressure of fluid, the viscosity of fluid, the viscosity index of the fluid, the density of fluid, the electrical resistance of fluid, the dielectric constant of fluid, the opacity of fluid, the chemical composition of fluid, the origin of the fluid and combinations of two or more thereof. The amount of fluid includes the absence of the fluid.

The stored data may comprise data based upon at least one sensed property of the fluid. The data provider may be adapted to communicate with the control device by providing data to the control device which data comprises at least part of the stored data.

The data provider may be adapted to receive data from the control device and to provide data to the control device in response to the received data. Where the data provider comprises a memory, the memory may be adapted to store data selected from the group consisting of: data received from the control device; data which comprises at least one property of a fluid in the reservoir of the container. Data received from the control device may comprise at least one piece of data selected from the group consisting of an engine operating condition, a predicted service interval and combinations thereof.

In computer implemented methods of the present disclosure, providing data to a memory at the fluid container may comprise storing data obtained from the control device in the memory. Where data is provided into memory in response to a received signal, the data may comprise data obtained from the received signal, and/or data obtained from a further signal received from an engine control device, and/or data obtained from a sensor at the container.

Providing data to a control device may comprise providing data relating to the fluid container, and the data may comprise at least one property of a fluid in a reservoir of the container. For example, such methods may comprise sensing at least one property of the fluid in the reservoir of the container; and providing the sensed data to the control device. Providing data to a control device may comprise obtaining the data from memory at the fluid container.

The data provider may comprise a data module. The data module may be encapsulated, and it may be provided as a single unit however this is optional and the data module need not be encapsulated. In addition, the term module should not be taken to imply a single unit or element, it will be appreciated by the skilled addressee in the context of the present disclosure that the module may comprise a plurality of elements which may be distributed about, or integrated within, or otherwise carried by one or more elements of the container.

According to at least some embodiments of the present invention, communication of data between the data module of a fluid container and the engine control device is dependent upon the presence of fluidic communication between the fluid container and a fluid circulation system of the engine. According to at least some embodiments, the data module is adapted such that data is not communicated with the engine control device unless the reservoir is in fluidic communication with the fluid circulation system of the engine. This may enable a type of safety interlock to give reliable engine control, for example based on properties of the fluid, whilst also allowing engine fluids to be quickly and conveniently replaced.

According to at least some embodiments, the data module is adapted to communicate data with the control device by providing data to the control device. This may enable control of the engine operation based upon properties of the fluid.

Thus, according to at least some embodiments the data module is adapted to communicate data with the engine control device by providing data to the engine control device, which data comprises at least one property of the fluid in the reservoir of the container.

This may enable control of the engine operation based upon properties of the fluid. Thus in at least some embodiments, operation of the engine is adjusted, for example by the engine control device, in response to at least one property of the fluid in the reservoir of the container.

According to at least some embodiments the container comprises a sensor adapted to sense at least one property of the fluid in the reservoir of the container and the data module is adapted to communicate data with the engine control device by providing data to the engine control device, which data comprises data based on at least one sensed property of the fluid in the reservoir of the container.

Examples of suitable properties of fluid in the reservoir of the container which are sensed include: the amount of fluid, the temperature of fluid, the pressure of fluid, the viscosity of fluid, the density of fluid, the electrical resistance of fluid, the dielectric of fluid, the opacity of fluid, the chemical composition of fluid and combinations of two or more thereof. The amount of fluid includes the absence of the fluid. Thus, the sensor may sense that there is no fluid in the reservoir and the data module is adapted to communicate data with the engine control device by providing data to the control device, which data comprises data based on at least one sensed property which includes the absence of fluid in the reservoir of the container.

Thus in at least some embodiments, operation of the engine is adjusted for example by the engine control device, in response to at least one sensed property of the fluid in the reservoir of the container, for example in response to changes of at least one sensed property of the fluid in the reservoir of the container.

According to at least some embodiments the data module comprises a memory adapted to store data which comprises at least one property of the fluid in the reservoir of the container.

In at least some embodiments the memory is adapted to store at least one property of the fluid which includes: the amount of fluid, the temperature of fluid, the pressure of fluid, the viscosity of fluid, the viscosity index of the fluid, the density of fluid, the electrical resistance of fluid, the dielectric of fluid, the opacity of fluid, the chemical composition of fluid, the origin of the fluid, an identifier of the fluid in the reservoir, the grade of the fluid, the date on which the fluid was filled or replaced in the reservoir and combinations of two or more thereof. The amount of fluid which is stored may include the absence of the fluid.

According to at least some embodiments the memory is adapted to store data which comprises at least one property of the fluid in the reservoir which is an initial property of the fluid in the reservoir. In at least some examples, this initial property data is pre-programmed into the memory.

Examples of suitable initial properties of the fluid in the reservoir of the container which are stored include: the amount of fluid, the temperature of fluid, the pressure of fluid, the viscosity of fluid, the viscosity index of the fluid, the density of fluid, the electrical resistance of fluid, the dielectric of fluid, the opacity of fluid, the chemical composition of fluid, the origin of the fluid, an identifier of the fluid in the reservoir and combinations of two or more thereof. The amount of fluid includes the absence of the fluid.

According to at least some embodiments the memory is adapted to store data which comprises data based upon at least one sensed property of the fluid in the reservoir of the container.

Examples of suitable sensed properties of the fluid in the reservoir of the container on which stored data are based include: the amount of fluid, the temperature of fluid, the pressure of fluid, the viscosity of fluid, the density of fluid, the electrical resistance of fluid, the dielectric of fluid, the opacity of fluid, the chemical composition of fluid and combinations of two or more thereof. The amount of fluid includes the absence of the fluid.

According to at least some embodiments the memory is adapted to store data which comprises both initial property data and sensed property data. In at least some embodiments the memory is adapted to store data which is derived (for example by the data module) from initial property data and sensed property data, for example the difference between an initial property data and a corresponding sensed property data. Examples of the stored data which is stored by the memory of the data module include: at least one property of the fluid in the reservoir which is an initial property of the fluid in the reservoir; at least one sensed property of the fluid in the reservoir of the container; data which is derived from initial property data and sensed property data, for example the difference between an initial property data and a corresponding sensed property data; data characteristic of the fluid in the reservoir of the container; and combinations of two or more thereof.

According to at least some embodiments the data module comprises a memory adapted to store data which comprises at least one property of the container.

According to at least some embodiments the memory is adapted to store data which comprises at least one initial property of the container.

In at least some embodiments the memory is adapted to store data which includes: the date on which the fluid in reservoir was filled or replaced, a unique identifier of the container, an indication of whether the container is new, or has previously been refilled or replaced, an indication of the operating duration of the fluid and/or engine (for example, the vehicle mileage if the engine is a vehicle engine), the number of times the container has been refilled or reused, and the total the operating duration of the container (for example, the vehicle mileage if the engine is a vehicle engine).

In at least some embodiments the data module is adapted to communicate with the control device by providing data to the control device which data comprises at least part of the stored data. Examples of the stored data which is provided to the control device by the data module include: properties of the fluid in the reservoir; initial properties of the fluid in the reservoir; sensed properties of the fluid in the reservoir; data which is derived from initial property data and sensed property data; data characteristic of the fluid in the reservoir of the container; an identifier of the fluid in the reservoir; the date on which the fluid in reservoir was filled or replaced; a unique identifier of the container; an indication of whether the container is new; or has previously been refilled or replaced; an indication of the operating duration of the fluid and/or engine (for example; the vehicle mileage if the engine is a vehicle engine); the number of times the container has been refilled or reused; the total the operating duration of the container (for example, the vehicle mileage if the engine is a vehicle engine) and combinations of two or more thereof.

This may enable identification of a need for the fluid to be changed.

This may also enable a service interval of the engine to be determined and/or adjusted, for example, by the data module and/or by the engine control device.

According to at least some embodiments the stored data comprises an identifier of the fluid. This may enable the engine control device to adjust operation of the engine dependent on the type of fluid. For example, in at least some embodiments, the control device is configured not to operate unless the provided data indicates that the fluid in the reservoir of the container comprises a selected type of fluid, for example suitable for the operation of the engine. According to at least some embodiments the engine control device is configured to operate the engine in one of two or more modes depending upon the communicated data. For example, if the fluid is an engine crankcase lubricating oil composition, the engine control device is configured to operate the engine in one of two or more modes depending upon the communicated data, for example the type of lubricating oil composition, for example according to the classification system xWy e.g. 5W30 etc.; or the origin of the lubricating oil composition. This may prevent or reduce the risk of inappropriate or counterfeit fluid being used. In some examples the engine control device is configured to operate the engine according to the quality or type of the fluid, the condition of the fluid, the temperature of the fluid, the age of the fluid (including whether it has been used previously), that the correct container has been fitted, whether the container requires replacement.

According to at least some embodiments, the data module is adapted to communicate with the control device by receiving data from the control device.

According to at least some embodiments, the data module is adapted to receive data from the control device and to provide data to the control device in response to the received data. According to some such embodiments, the data module comprises a memory adapted to store data which comprises at least one piece of data received from the control device. Suitably, data received from the engine control device comprises at least one piece of data selected from the group consisting of engine operating conditions, predicted service interval and combinations thereof.

According to at least some embodiments the data module is configured to provide data to the control device in response to data in the form of a signal indicating that the fluid reservoir is fluidic communication with the fluid circulation system.

According to at least some embodiments, the data module is also configured to receive a request signal from the engine control device, for example during operation of the engine, and to provide data to the engine control device in response to the received signal.

According to at least some embodiments, the data module is configured to provide data to the control device at periodic or aperiodic intervals. According to at least some embodiments, the data module is configured to provide data to the control device continuously, for example whilst the engine is operating.

According to at least some embodiments, the data module is configured to provide data based on at least one sensed property of the fluid in the reservoir of the container, to the engine control device in the event that a sensor senses that a property of the fluid in the reservoir of the container has one of a selected number of values, e.g. if a sensed property exceeds a selected range. This may enable the control device to adjust or stop operation of the engine in response to changes in the sensed property of the fluid.

According to another aspect of the present invention there is provided computer implemented method of facilitating control of an engine comprising a fluid circulation system in combination with a container as herein described in which the reservoir of the container is in fluidic communication with the engine fluid circulation system and contains fluid for the engine fluid circulation system, which method comprises providing data from the data provider of the container to the engine control device.

According to at least some embodiments the method further comprises controlling the operation of the engine.

According to at least some embodiments, the data provided to the control device comprises at least one property of the fluid in the reservoir of the container. According to at least some embodiments: the container comprises a sensor adapted to sense at least one property of the fluid in the reservoir of the container; the method comprises sensing at least one property of the fluid in the reservoir of the container with the sensor; and the method comprises providing data from the data module of the container to the control device, which data comprises data based on the sensed property of the fluid in the reservoir of the container.

Examples of suitable properties of the fluid in the reservoir of the container which are sensed include: the amount of fluid, the temperature of fluid, the pressure of fluid, the viscosity of fluid, the density of fluid, the electrical resistance of fluid, the dielectric of fluid, the opacity of fluid, the chemical composition of fluid and combinations of two or more thereof. The amount of fluid includes the absence of the fluid.

According to at least some embodiments: the data module comprises a memory; the method comprises storing data in the memory, which data comprises at least one property of the fluid in the reservoir of the container; and the method comprises providing data from the data module to the engine control device, which data comprises at least part of the stored data.

Examples of suitable properties of the fluid in the reservoir of the container which are stored include: the amount of fluid, the temperature of fluid, the pressure of fluid, the viscosity of fluid, the viscosity index of the fluid, the density of fluid, the electrical resistance of fluid, the dielectric of fluid, the opacity of fluid, the chemical composition of fluid, the origin of the fluid, an identifier of the fluid in the reservoir, the grade of the fluid, the date on which the fluid was filled or replaced in the reservoir and combinations of two or more thereof. The amount of fluid includes the absence of the fluid.

In at least some embodiments the memory stores data including: the date on which the fluid was filled or replaced, a unique identifier of the container, an indication of whether the container is new, or has previously been refilled or replaced, an indication of the operating duration of the fluid and/or engine (for example, the vehicle mileage if the engine is a vehicle engine), the number of times the container has been refilled or reused, and the total the operating duration of the container (for example, the vehicle mileage if the engine is a vehicle engine).

According to at least some embodiments an initial property of the fluid in the reservoir is stored in the memory. In at least some examples, this initial property data is pre-programmed into the memory. Examples of suitable initial properties of the fluid in the reservoir of the container which are stored include: the amount of fluid, the temperature of fluid, the pressure of fluid, the viscosity of fluid, the viscosity index of the fluid, the density of fluid, the electrical resistance of fluid, the dielectric of fluid, the opacity of fluid, the chemical composition of fluid, the origin of the fluid, an identifier of the fluid in the reservoir and combinations of two or more thereof. The amount of fluid includes the absence of the fluid.

According to at least some embodiments data that is stored in the memory comprises data based upon at least one sensed property of the fluid in the reservoir of the container.

According to at least some embodiments data is stored in the memory which comprises both initial property data and sensed property data. In at least some embodiments data is stored in the memory which is derived (for example by the data module) from initial property data and sensed property data, for example the difference between an initial property data and a corresponding sensed property data. Examples of the stored data which is stored by the memory of the data module include: at least one property of the fluid in the reservoir which is an initial property of the fluid in the reservoir; at least one sensed property of the fluid in the reservoir of the container; data which is derived from initial property data and sensed property data, for example the difference between an initial property data and a corresponding sensed property data; data characteristic of; and combinations of two or more thereof.

In at least some embodiments, the data module communicates with the control device by providing data to the control device which data comprises at least part of the stored data. Examples of the stored data which is provided to the control device by the data module include: properties of the fluid in the reservoir; initial properties of the fluid in the reservoir; sensed properties of the fluid in the reservoir; data which is derived from initial property data and sensed property data; data characteristic of the fluid in the reservoir of the container; an identifier of the fluid in the reservoir; the date on which the fluid in reservoir was filled or replaced; a unique identifier of the container; an indication of whether the container is new; or has previously been refilled or replaced; an indication of the operating duration of the fluid and/or engine (for example; the vehicle mileage if the engine is a vehicle engine); the number of times the container has been refilled or reused; the total the operating duration of the container (for example, the vehicle mileage if the engine is a vehicle engine) and combinations of two or more thereof.

This may enable a need for the fluid to be changed to be identified.

This may also enable a service interval of the engine to be determined and/or adjusted, for example, by the data module and/or by the engine control device.

Thus, according to at least some embodiments, a service interval of the engine is determined and/or is adjusted in response to the data provided by the data module to the engine control device. According to at least some embodiments, the service interval is determined and/or adjusted by the data module and/or by the control device. Examples of suitable data provided by the data module to the control device include: at least one property of the fluid in the reservoir of the container; data based on at least one sensed property of the fluid in the reservoir of the container; stored data; initial properties of the fluid in the reservoir; sensed properties of the fluid in the reservoir; data which is derived from initial property data and sensed property data; the origin of the fluid; an identifier of the fluid in the reservoir; and combinations of two or more thereof.

Thus, according to at least some embodiments, the stored data comprises an identifier of the fluid which is stored in the memory. This may enable the engine control device to adjust operation of the engine dependent on the type of fluid. For example, in at least some embodiments, the control device does not operate unless the provided data indicates that the fluid in the reservoir of the container comprises a selected type of fluid, for example suitable for the operation of the engine. According to at least some embodiments the control device operates the engine in one of two or more modes depending upon the communicated data. For example, if the fluids is an engine crankcase lubricating oil composition, the control device operates the engine in one of two or more modes depending upon the communicated data, for example the type of lubricating oil composition, for example according to the classification system xWy e.g. 5W30 etc.

According to at least some embodiments: the data module is adapted to communicate with the control device by receiving data from, and providing data to, the control device; and the method comprises receiving data from the control device with the data module and providing data from the data module to the control device in response to the received data. Suitably, data received from the control device comprises at least one piece of data selected from the group consisting of engine operating conditions, predicted service interval and combinations thereof.

In at least some embodiments the data received by the data module is used by the data module to performed some of the data manipulation and/or storage which might otherwise be performed by the engine control device, for example calculating servicing intervals. In at least some examples the data received by the data module is used by the data module to control flow of fluid to and/or from the reservoir, for example if the engine requires the fluid flow to cease because the container/reservoir is to be disconnected from the fluid circulation system.

According to at least some embodiments: the data module is configured to provide data to the engine control device in response to data in the form of a signal indicating that the fluid reservoir is fluidic communication with the fluid circulation system of the engine and the method comprises providing data from the engine control device to the data module in the form of a signal indicating that the fluid reservoir is in fluidic communication with the fluid circulation system of the engine, and providing data from the from the data module to the engine control device.

According to at least some embodiments, in the method, the data module provides data to the engine control device at periodic intervals. According to at least some embodiments, in the method, the data module provides data to the engine control device at aperiodic intervals. According to at least some embodiments, in the method, the data module provides data to the engine control device continuously.

According to at least some embodiments, the data module is configured to provide data based on at least one sensed property of the fluid in the reservoir of the container, to the engine control device in the event that a sensor senses that a property of the fluid in the reservoir of the container has one of a selected number of values, e.g. if a property exceeds a selected range. According to at least some embodiments the method further comprises the engine control device adjusting or stopping operation of the engine in response to changes in at least some of the sensed data.

Examples of suitable properties of the fluid in the reservoir of the container which are sensed include: the amount of fluid, the temperature of fluid, the pressure of fluid, the viscosity of fluid, the density of fluid, the electrical resistance of fluid, the dielectric of fluid, the opacity of fluid, the chemical composition of fluid and combinations of two or more thereof. The amount of fluid includes the absence of the fluid.

According to at least some embodiments the method further comprises the engine control device adjusting or stopping operation of the engine in response to changes in at least some of the data provided by the data module to the engine control device.

In at least some embodiments, the engine control device controls the engine in response to data provided by the data module by for example: limiting the performance features of the engine (for example if the quality or type of the fluid is not particularly suitable for the engine); changing the operation of the engine for example if the fluid is depleted; changing the operation according to the type of the fluid; changing the operation according to the temperature of the fluid; preventing or limiting operation of the engine if the fluid is not of the correct type or origin or has reached the end of its useful life, or if the container is not correctly fitted or if the container has reached the end of its useful life.

In some embodiments the received signal indicates that the reservoir of the container is in fluidic communication with the fluid circulation system of the engine. For example, the fluid container may comprise latches for retaining the reservoir in fluidic communication with the fluid circulation system, and the latches may be configured to provide data in the form of a signal to the data module indicating that the reservoir is in fluidic communication with the fluid circulation system of the engine. The received signal may also be provided by the engine control device. The latch may be part of the one or more self-sealing couplings.

According to some embodiments the data module comprises at least one printed circuit board (sometimes called a PCB). In some examples the PCB is adapted to communicate with the engine control device through electrical contacts on the replaceable container adapted to engage corresponding contacts on or associated with the engine.

According to at least some embodiments the data module comprises a computer readable identifier, for example an electronic identifier. Suitable identifiers include PCB's, radio frequency communicators, such as near field RF communicators, examples of which include NFC communicators (e.g. communicators which support the RF requirements for ISO/IEC 14443A, ISO/IEC 14443 B and FeliCa as outlined in the relevant parts in the ISO 18092) and passive or active radio frequency identification tags (sometimes called RFID tags).

According to another aspect of the present invention there is provided a computer readable medium comprising program instructions operable to program a processor carried by a fluid container to control an engine by performing a method of facilitating control of an engine comprising a fluid circulation system as described herein.

According to at least some embodiments the computer readable medium comprises a non-volatile memory. In at least some embodiments the computer readable medium is carried on a fluid container for fluid for a fluid circulation system of an engine as herein described.

According to another aspect of the present invention there is provided a vehicle comprising:
a replaceable fluid container comprising a reservoir for holding fluid, at least one self-sealing coupling and a data module fluid;

an engine comprising a fluid circulation system and a control device;

in which the reservoir is connected by the self-sealing coupling in fluidic communication with the fluid circulation system of the engine, and the data module is adapted to communicate data with the engine control device.

Suitably, the replaceable fluid container is a container as herein described. According to at least some embodiments the fluid container comprises an inlet and an outlet for the reservoir. When the engine is operating, fluid flows into the reservoir from the fluid circulation system of the engine through the inlet. When the engine is operating, fluid flows out of the reservoir into the fluid circulation system of the engine through the outlet. The inlet and outlet suitably comprise self-sealing couplings.

According to at least some embodiments the fluid container comprises a vent. Suitably, when the engine is operating the vent is connected in fluidic communication with the engine, for example with the fluid circulation system of the engine. In at least some examples, the engine is an internal combustion engine and when the engine is operating, the vent is in fluid communication with an air inlet manifold of the engine. Suitably, the vent is connected to the engine through a self-sealing coupling. Self-sealing couplings have an advantage in that they facilitate removal and replacement of the replaceable container from and to the engine. When the engine is operating, gas and/or vapour, may flow into and/or out from the reservoir through the vent port or vent ports when the fluid container is connected to the engine fluid circulation system.

Suitably, the fluid container may comprise at least one latch which is adapted to retain the reservoir of the fluid container in fluidic communication with said engine fluid circulation system. The latch may be remotely operable to disconnect said fluid container from said vehicle engine fluid circulation system. In some examples the fluid container is elongate; said inlet, outlet and vent ports are located at a common first end of said container.

In general, self-sealing couplings have the characteristic that when the coupling is being connected, a seal is made between the connecting ports before valve or valves open to allow fluid to flow. On disconnection, the valve or valves close to seal off each of the ports before the coupling seal between the ports is broken.

Suitable self-sealing couplings of the system provide a "dry break" in which no fluid flows on connection or disconnection of the coupling. Alternatively, the self-sealing couplings of the system provide a "damp break" in which there is flow of only a non-essential amount of fluid, for example a few drips of liquid, on disconnection or connection of the coupling. Suitable self-sealing couplings include rallye raid SPT12 couplings available from Stäubli. Other suitable types of self-sealing coupling are described in US 2005/0161628, US2008/0265574 and US2008/0088127.

According to at least some examples, each of the self-sealing couplings comprises a latch which is biased to a locking position to thereby retain the reservoir in fluidic communication with the engine fluid circulation system. This has an advantage that when the fluid container is positioned to connect it to the engine, the latches engage the corresponding ports on the engine and retain the fluid reservoir in fluidic communication with the fluid circulation system of the engine. In at least some examples each latch is remotely operable to disconnect the reservoir from the vehicle engine fluid circulation system.

In at least some examples, the self-sealing couplings also retain the fluid container on the engine. In at least some example, the self-sealing couplings also retains the fluid container on a manifold which is in fluidic communication with the fluid circulation system of the engine.

According to at least some embodiments each latch is operable by a remotely operable actuator, for example an electromagnetic actuator. This may operate one or more of the latches. Suitable electromagnetic actuators comprise a solenoid which comprises a central core which is a push or pull rod which is magnetically actuated.

Interlocks may be provided to prevent the engine from operating if the fluid container is disconnected from the engine fluid circulation system and/or to prevent the fluid container being disconnected from the engine if the engine is operating.

In at least some embodiments the engine fluid circulation system comprises one or more ports adapted to connect with the self-sealing couplings of the replaceable fluid container. In at least some examples, at least one (for example all) of the ports of the engine fluid circulation system comprises a non-return valve. Non-return valves may prevent fluid from draining back to the fluid container when the engine is not operating. In at least some examples the ports each comprise a control valve or shut-off valve which may be closed when the vehicle engine is not operating, for example to prevent or reduce fluid draining from the fluid container to the engine.

In at least some examples the engine fluid system comprises a vent port adapted to connect to a vent self-sealing coupling of the fluid container. Suitably, the vent port does not comprise any valves because fluid, for example gas and/or vapour, may be required to flow both to and from the reservoir of the container through the vent port or vent ports when the fluid container is connected to the engine fluid circulation system.

Suitably, the ports of the engine fluid circulation system are self-sealing ports. This has an advantage that when the fluid container has been disconnected from the engine, the risk of ingress of contaminants into the engine may be mitigated.

In at least some embodiments the fluid container comprises a filter for filtering the fluid. This is suitable when the fluid is an engine lubricating oil composition.

In at least some embodiments the fluid container is a container for a fluid which is a liquid. Suitable liquids include engine lubricating oil compositions, heat exchange fluids for example for an electric engine, de-icers, water, screen-washes, and detergents. The fluid may be a fluid suitable for a sustainable fluid system for example engine lubricating oil compositions and heat exchange fluids. The fluid may be a fluid suitable for a non-sustainable fluid system for example de-icers, water, screen-washes and detergents.

Suitably the fluid is a lubricating oil composition, for example an engine lubricating oil composition. In some embodiments the reservoir of the fluid container contains lubricating oil composition, for example engine lubricating oil composition. In this embodiment, the fluid container may be provided as a self-contained system containing fresh, refreshed or unused lubricating oil composition which may conveniently replace a fluid container on an engine containing used or spent lubricating oil composition. If the fluid container also comprises a filter, this also is replaced together with the spent or used lubricating oil composition.

According to at least some embodiments, the lubricating oil composition comprises at least one base stock and at least one engine lubricating oil additive. Suitable base stocks include bio-derived base stocks, mineral oil derived base stocks, synthetic base stocks and semi synthetic base stocks. Suitable lubricating oil composition additives, for example engine lubricating oil composition additives are known in the art. Suitable additives include organic and inorganic compounds. In at least some embodiments, in the engine lubricating oil composition comprises about 60 to 90% by weight in total of base stocks and about 40 to 10% by weight additives. In at least some embodiments, the engine lubricating oil composition is a lubricating oil composition for an internal combustion engine. Suitable lubricating oil compositions include mono-viscosity grade and multi-viscosity grade engine lubricating oil compositions. Suitable lubricating oil compositions include single purpose lubricating oil compositions and multi-purpose lubricating oil compositions.

Suitable lubricating oil compositions include engine lubricating oil compositions for internal combustion engines. Suitable engine lubricating oil compositions include lubricating oil compositions for spark ignition internal combustion engines. Suitable engine lubricating oil compositions include lubricating oil compositions for compression internal combustion engines.

According to at least some embodiments the fluid container is a container for heat exchange fluid for example for an electric engine. Thus, in at least some embodiments the fluid container contains heat exchange fluid for an electric engine. In at least some example, the replaceable fluid container is provided as a self-contained system containing fresh, refreshed or unused heat exchange fluid for an electric engine which conveniently replaces a system on an engine containing used or spent heat exchange fluid. If the fluid container also comprises a filter, this also is replaced together with the spent or used heat exchange fluid.

Electric engines may require heat exchange fluid to heat the engine and/or cool the engine. This may depend upon the operating cycle of the engine. Electric engines may also require a reservoir of heat exchange fluid. The fluid container may provide a heat storage system in which heat exchange fluid may be stored for use to heat the electric engine when required. The fluid container may provide a system for storage of coolant at a temperature below the operating temperature of the engine for use to cool the electric engine when required.

Suitable heat exchange fluids for electric engines include aqueous and non-aqueous fluids. In at least some examples heat exchange fluids for example for electric engines comprise organic and/or non-organic performance boosting additives. Suitable heat exchange fluids include man-made and bio-derived, for example Betaine fluids. Suitable heat exchange fluids include those which exhibit fire retarding characteristics and/or hydraulic characteristics. Suitable heat exchange fluids include phase change fluids. Suitable heat exchange fluids include molten metals and salts. Suitable heat exchange fluids include nanofluids. Nanofluids comprise nanoparticles suspended in a base fluid, which may be solid, liquid or gas. Suitable heat exchange fluids include gases and liquids. Suitable heat exchange fluids include liquefied gases.

In at least some examples the fluid container is adapted to operate at temperatures of from ambient temperature up to 200° C., suitably from −20° C. to 180° C., for example from −10° C. to 150° C.

In at least some examples the fluid container is adapted to operate at pressures of up to 15 barg, suitably from −0.5 barg to 10 barg, for example from 0 barg to 8 barg. According to another aspect of the present invention there is provided an engine control system comprising a container as herein described in combination with an engine comprising a fluid circulation system in which the reservoir of the container is in fluidic communication with the engine fluid circulation system.

In at least some embodiments the engine control device comprises a memory.

In at least some embodiments the engine control device comprises a microprocessor.

In at least some embodiments the engine is a vehicle engine. Suitable vehicles include motorcycles, earthmoving vehicles, mining vehicles, heavy duty vehicles and passenger cars.

According to another aspect of the present invention there is provided a vehicle comprising an engine, a fluid circulation system for said engine and a replaceable fluid container comprising a reservoir for holding fluid, at least one self-sealing coupling connecting said reservoir in fluidic communication with the fluid circulation system and a data module adapted to communicate with an engine control device when the reservoir is in fluidic communication with the fluid circulation system. Suitable fluid containers include replaceable fluid containers as hereindescribed, more suitably according to the present invention.

In at least some embodiments the engine is a vehicle engine. Suitable vehicles include motorcycles, earthmoving vehicles, mining vehicles, heavy duty vehicles and passenger cars.

The fluid container is advantageous where rapid replacement of the fluid is required or advantageous, for example in "off-road" and/or "in field" services.

According to a further aspect of the present invention, there is provided a method of supplying fluid to a vehicle engine comprising a fluid circulation system, which method comprises connecting to said fluid circulation system, a fluid container as herein described, in which the reservoir of the container contains fluid as herein described.

Whilst fluid containers, methods and control systems for engines, for example vehicle engines, have been described herein, the present invention also relates to fluid containers, methods and control systems for fluid systems of vehicles in general whether or not associated with an engine.

Thus, according to a further aspect of the present invention there is provided a replaceable fluid container for a vehicle, for example for a vehicle engine, the container comprising:
  a reservoir for holding a fluid;
  a fluid coupling adapted to provide fluidic communication between the reservoir and a fluid circulation system of a vehicle, for example of a vehicle engine; and
  a data provider arranged such that positioning the container to permit fluidic communication between the reservoir and the fluid circulation system arranges the data provider for data communication with a control device of the vehicle, for example with an engine control device of an engine on the vehicle.

The invention extends to methods and/or apparatus substantially as herein described with reference to the accompanying drawings.

Any feature in one aspect of the invention may be applied to other aspects of the invention, in any appropriate combination. In particular, features of method aspects may be applied to apparatus aspects, and vice versa.

Embodiments of the invention will now be described, by way of example only, with reference to the accompanying drawings, in which.

In the drawings, like reference numerals are used to indicate like elements.

Figure 1:
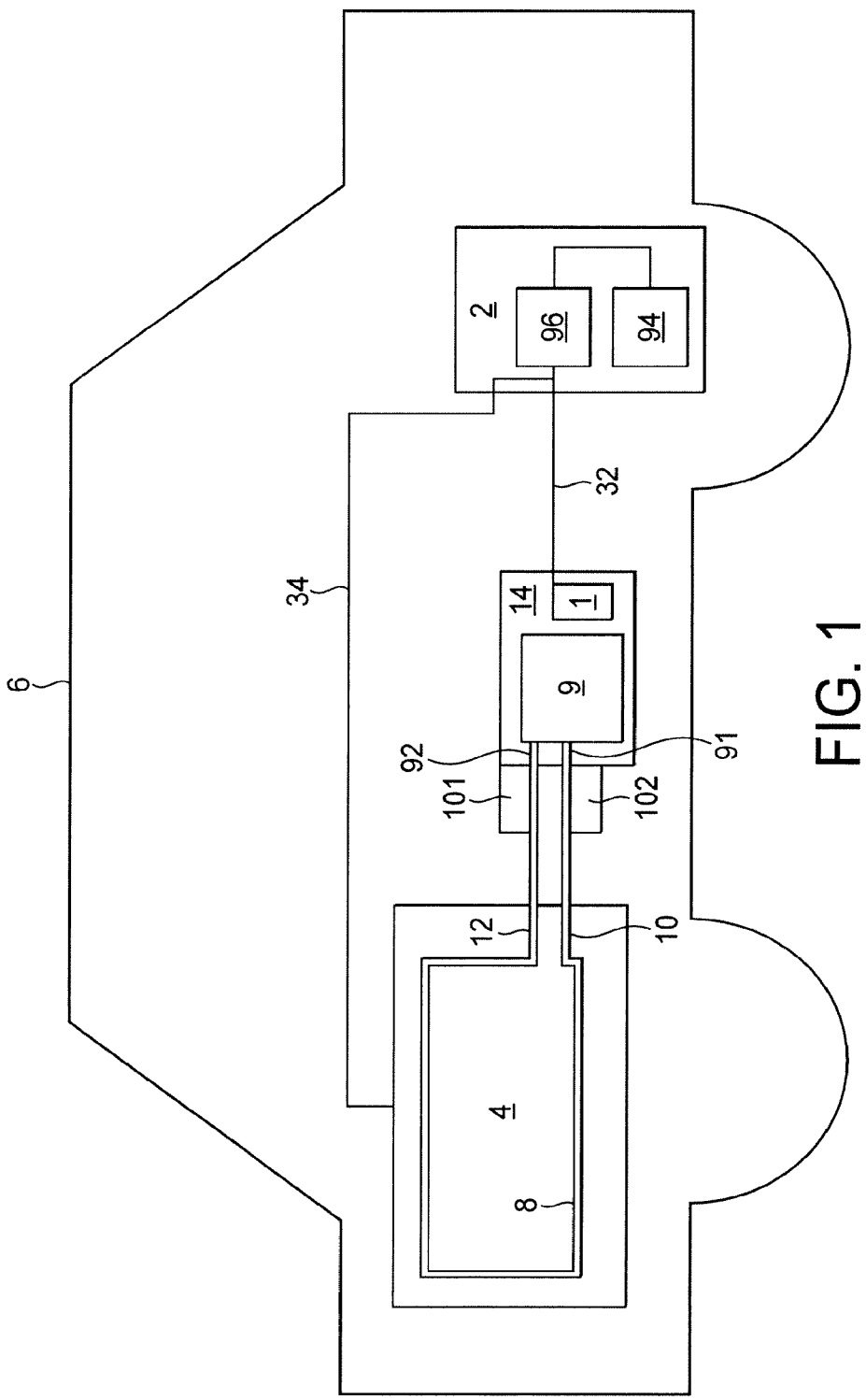
FIG. 1 shows a schematic illustration of a vehicle.

FIG. 1 shows a vehicle 6 comprising an engine 4, a fluid container 14 and an engine control device 2. The engine 4 comprises a fluid circulation system 8.

The fluid circulation system 8 is coupled to receive fluid from a supply line 10, and to return fluid that has circulated in the engine 4 via a fluid return line 12.

The fluid container 14 comprises a reservoir 9 for holding a fluid, and a data provider 1 for providing data about the fluid container 14. The data provider 1 is coupleable to provide data to the engine control device 2 via a first communication link 32. The fluid container 14 comprises a fluid outlet port 91 which is coupled to the reservoir 9. The outlet port 91 is coupleable to supply fluid to the engine's fluid circulation system 8 via a fluid supply line 10. The fluid inlet port 92 is coupleable to the fluid return line 12 to enable fluid to circulate from the reservoir 9, around the circulation system 8 of the engine 4, and back to the reservoir 9. The fluid container 14 is described in more detail below with reference to FIG. 2.

The ports 91, 92 of the fluid container 14 comprise self-sealing couplings, and the container comprises latches 101, 102 configured to secure the container 14 to the fluid supply line 10 and the fluid return line 12. The latches are operable to be released to enable the container 14 to be removed and replaced.

The engine control device 2 comprises a processor 96, and a memory 94 configured to store control data for the engine 4. The processor 96 is configured to monitor and to control the operation of the engine 4, via a second communication link 34. The processor 96 is configured to control operation of the engine 4 based on the monitoring, and based on the control data read from the memory 9. The engine control device 2 is further configured to obtain data from the data provider 1 via the communication link 32 and to control the engine based on the data obtained from the data provider 1.

In operation, the fluid container 14 is secured in fluid communication with the fluid circulation system 8 by the latches 101, 102. When the fluid container 14 is secured by the latches, the data provider 1 is coupled to communicate with the engine control device 2 by the first communication link 32. The engine control device 2 regulates operation of the engine 4 based on data obtained from the data provider 1 in combination with data obtained from monitoring operation of the engine 4, and data stored in the memory 94 of the engine control device 2.

Figure 2:
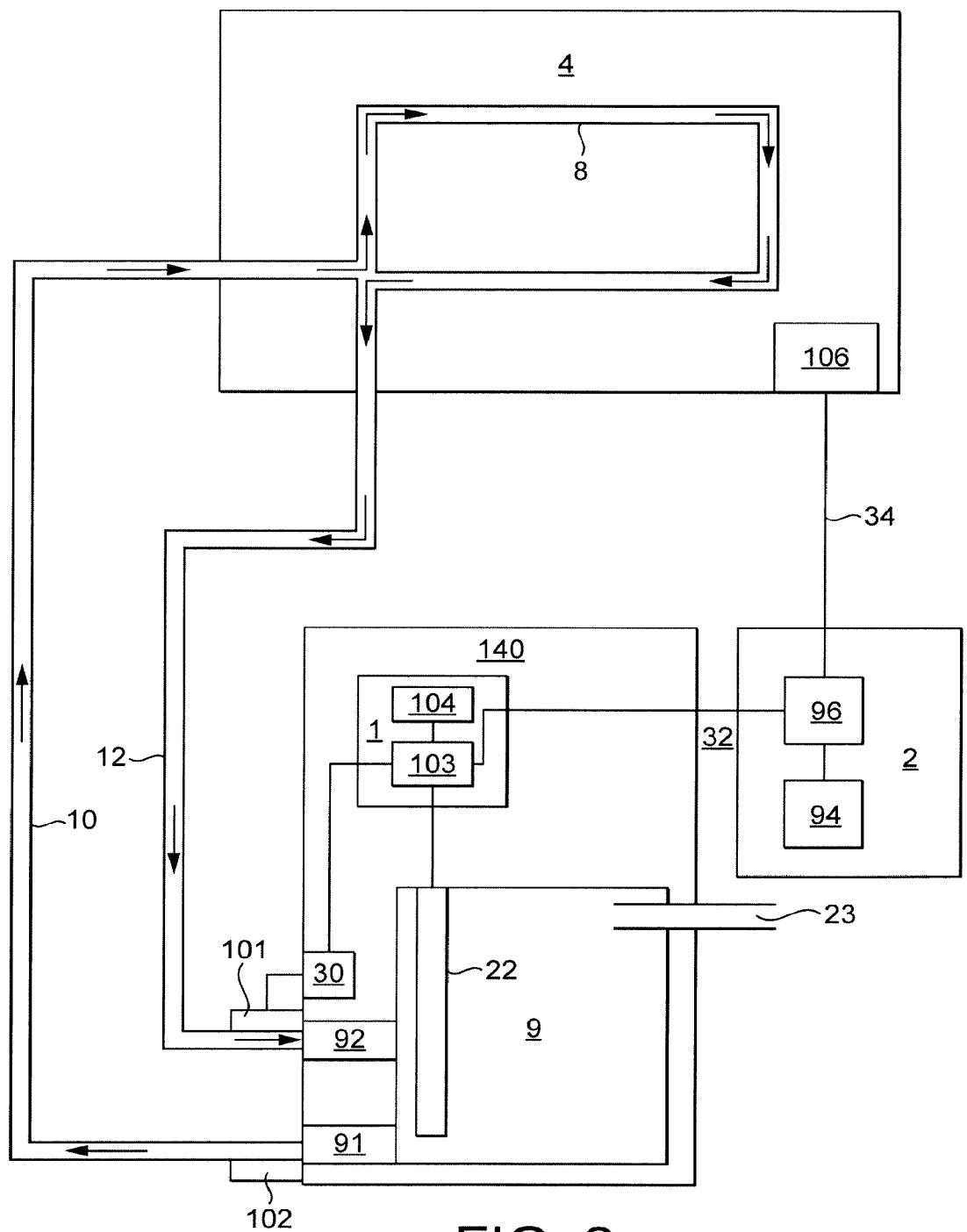
FIG. 2 shows a schematic illustration of components of the vehicle of FIG. 1

FIG. 2 shows a fluid container 140, an engine control device 2, and an engine 4, the features of any of which may be used in combination with those of the example shown in FIG. 1.

The fluid container 140 comprises a reservoir 9 for holding a fluid, and a vent 23 to enable pressure to be equalised in the reservoir 9 as fluid is drawn into and out from the reservoir 9. The fluid container 140 comprises latches 101, 102 and a latch sensor 30 for sensing when the latches 101, 102 are engaged to retain the fluid container 140 in fluid communication with the fluid circulation system 8

The fluid sensor 22 comprises two metallic strips separated from one another on a dip tube of the fluid container 14. The fluid sensor 30 senses the oil level in the reservoir 9 based on the capacitance of the strips to provide a signal indicative of the oil level to the data provider 1. The fluid sensor 22 is further configured to sense an electrical resistance of the fluid thereby to provide an indication of the presence of impurities in the fluid.

The data provider 1 of the fluid container 140 comprises a processor 103 arranged to receive signals from the fluid sensor 22 and the connection sensor 30, and to communicate data to the engine control device 2 via the communication link 32. The data provider 1 further comprises a memory 104 for storing data describing the fluid. In particular, the memory 104 stores data including at least one of: the grade of fluid, the type of fluid, the date on which the fluid was filled or replaced, a unique identifier of the container 140, an indication of whether the container is new, or has previously been refilled or replaced, an indication of the vehicle mileage, the number of times the container has been refilled or reused, and the total mileage for which the container has been used.

The engine 4 shown in FIG. 2 comprises an engine communication interface 106 arranged to communicate operational parameters of the engine, such as engine speed and throttle position to the processor 96 of the engine control device 2 via the communication link 34. The engine communication interface 106 is further operable to receive engine commands from the engine control device 2 and to modify operation of the engine 4 based on the received commands.

The memory 94 of the engine control device 2 comprises non-volatile memory configured to store:
identifiers of acceptable fluids for use in the engine 4;
data defining a first container fluid level threshold and a second fluid level threshold;
data indicative of an expected container oil level based on the mileage of the vehicle;
data defining a service interval, wherein the service interval is the time period between performing maintenance operations for the vehicle such as replacing the fluid;
the vehicle mileage;
sets of engine configuration data for configuring the engine to operate in a selected way;
an association (such as a look up table) associating fluid identifiers with the sets of engine configuration data; and,
data indicative of an expected oil quality based on the mileage of the vehicle.

The processor 96 is operable to compare data stored in the memory 94 with data obtained from the data provider 1 of the container 140 and from the communication interface 106 of the engine 4.

In operation, the processor 104 of the data provider 1 of the container provides an identifier of the fluid to the processor 96 of the engine control device 2. The processor 96 determines whether the correct fluid is in use based on the fluid identifier from the data provider 1, and the identifiers stored in the memory 94. In the event that the processor 96 determines that the container does not comprise an acceptable fluid, the processor 96 is configured to alert the user of the vehicle and/or to prevent operation of the engine 4. In the event that the processor 96 determines that the container does comprise an acceptable fluid, the engine control device 2 enables operation of the engine 2. This provides an electronic lock to inhibit unsafe or sub-optimal operation of the engine, and may detect and inhibit the use of counterfeit fluid products, or unauthorised refilling of the container 140.

If operation of the engine is enabled, the processor 96 obtains a set of configuration data for the engine 2 from the memory 94 based on the stored associations, and the fluid identifier provided by the data provider 1. This enables the operation of the engine to be configured or reconfigured according to the characteristics of the fluid. When the engine is running, the processor 96 is configured to communicate with the data provider 1, and in the event that the data provider indicates that the characteristics of the fluid have changed, the configuration of the engine may be adjusted in response to these changes. This enables the engine to adapt to real-time changes in the characteristics of the fluid.

The processor 103 of the container 140 is configured to obtain data indicating the expected fluid level based on the mileage since the fluid was last refilled, and to compare the fluid level sensed by the sensor 22 with stored data. In the event that this comparison indicates that the fluid level is changing more quickly than expected, the data provider 1 can be configured to send a signal to the engine control device 2 to modify a service interval for the vehicle based on this comparison.

The fluid may be any type of fluid circulated in the engine 4 to support a function of the engine, which may be an ancillary function of the engine. For example the fluid may be lubricant, or coolant, or de-icer, or any other fluid associated with the engine. As many different types and grades of such fluid are available, the data provider may comprise an identifier of the fluid.

The data provider 1 may comprise a memory storing an identifier of the fluid, and a communication interface to enable data stored in the memory of the data provider 1 to be passed via the communication link 32 to the processor 96 of the engine control device. The data provider 1 may comprise a computer readable identifier for identifying the fluid, the identifier may be an electronic identifier, such as a near field RF communicator, for example a passive or active RFID tag, or an NFC communicator.

The data provider 1 may be configured for one way communication. For example the data provider 1 may be configured only to receive data from the engine control device, so that the data can be provided to memory at the container. Alternatively the data provider 1 may be configured only to provide data to the engine control device. In some possibilities the data provider 1 is adapted to provide data to and receive data from the engine control device. The receiving and providing of data may be to, from or between (i) a memory/memories and/or processor(s) of the engine control device and (ii) the data provider and/or sensor(s) of the data provider and/or a memory/memories of the data provider.

The memory can store data comprising at least one property of the fluid selected from the group consisting of: the amount of fluid, the temperature of fluid, the pressure of fluid, the viscosity of fluid, the viscosity index of the fluid, the density of fluid, the electrical resistance of fluid, the dielectric constant of fluid, the opacity of fluid, the chemical composition of fluid, the origin of the fluid and combinations of two or more thereof. The memory may also be configured to receive data from an engine control device. This enables data to be stored at the container. Such stored data can then be provided from the memory to diagnostic devices during servicing and/or during replacement of the container. The amount of fluid includes the absence of the fluid.

The memory is optional. The computer readable identifier may be an optical identifier, such as a barcode, for example a two-dimensional barcode, or a colour coded marker, or optical identifier on the container. The computer readable identifier may be provided by a shape or configuration of the container 14. Regardless of how it is provided, the identifier may be encrypted.

The communication link 32 may be any wired or wireless communication link, and may comprise an optical link.

The latches 101, 102, are optional and the container 14, 140 may simply be fluid coupled to the circulation system. The container 14, 140 can be secured by gravity, an interference fit, a bayonet coupling, or any appropriate fixture. The data provider 1 may be positioned on the container 140 so that, when the container is coupled in fluidic communication with the fluid circulation system of the engine, the data provider 1 is also arranged to communicate data with the engine control device, and if the container is not positioned for fluidic communication with the fluid circulation system, communication with the data provider is inhibited.

The container 140 has been described as comprising particular types of sensors. However, one or both of these sensors may be omitted, e.g. as in FIG. 1 above. Where sensors are used any type of sensor, or combination of sensors can be used. For example, to sense the level of fluid in the container: a mechanical float, a position sensor, an electrical coil, capacitive sensors, resistivity sensors, ultrasonic level detection, visible or infra-red light detection, pressure sensing, or other sensors. The sensing system may provide information about the level in a continuous range between two fixed points or as discrete levels (e.g. full, half full, empty). Additionally, if the level of the liquid increased rapidly it could indicate some form of failure in the engine and provide an early warning mechanism to help prevent further damage to the engine. The containers 14, 140 may comprise sensors configured to sense at least one of a temperature, pressure, viscosity, density, electrical resistance, dielectric constant, opacity, chemical composition or amount of the container oil. It will further be appreciated that a plurality of fluid sensors could be provided, each to sense a different property of the fluid.

Information about the oil quality may be obtained through simple capacitance or resistivity measurements. These might, for example, indicate the presence of water in the oil or of metallic or carbonaceous particulates suspended in the oil.

The fluid container 14, 140 may be a container for an engine lubricating oil composition, a heat exchange fluid for cooling at least some working components of the engine 4, and/or heating some working components of the engine 4.

In the context of the present disclosure, those skilled in the art will appreciate that the fluid ports of the fluid container 14, 140 could comprise any suitable coupling for retaining the fluid container 14, 140 in fluid communication with the fluid circulation system 8. The port couplings could be arranged to be remotely decoupled from the fluid lines 10, 12 to place the fluid container 14 in its uncoupled configuration. It will further be appreciated that the fluid container 14 could comprise an actuator to decouple the fluid container 14, 140 from the circulation system 8.

Although circulated engine oil is described as being returned to the fluid container 14, 140 for recirculation, in the context of the present disclosure, those skilled in the art will appreciate that circulated engine oil could be collected and stored in a container coupled to the engine 4 and, when convenient, emptied from or otherwise removed from the vehicle 6.

Although the metallic strips of the sensor 22 are described as being on an oil dip tube, they may be located on an inner wall of the fluid container 14, 140.

A position sensor could be configured to provide signals indicative of a continuous range of oil levels between two predetermined values, for example a first value indicating the fluid container is full and a second value indicating the container is empty, or only for predetermined oil levels, such as "full", "half full" or "empty". The position sensor 30 could be configured to communicate continuously with the container module 16 or at selected time intervals or in response to a signal from the processor 96 of the engine control device.

Figure 3:
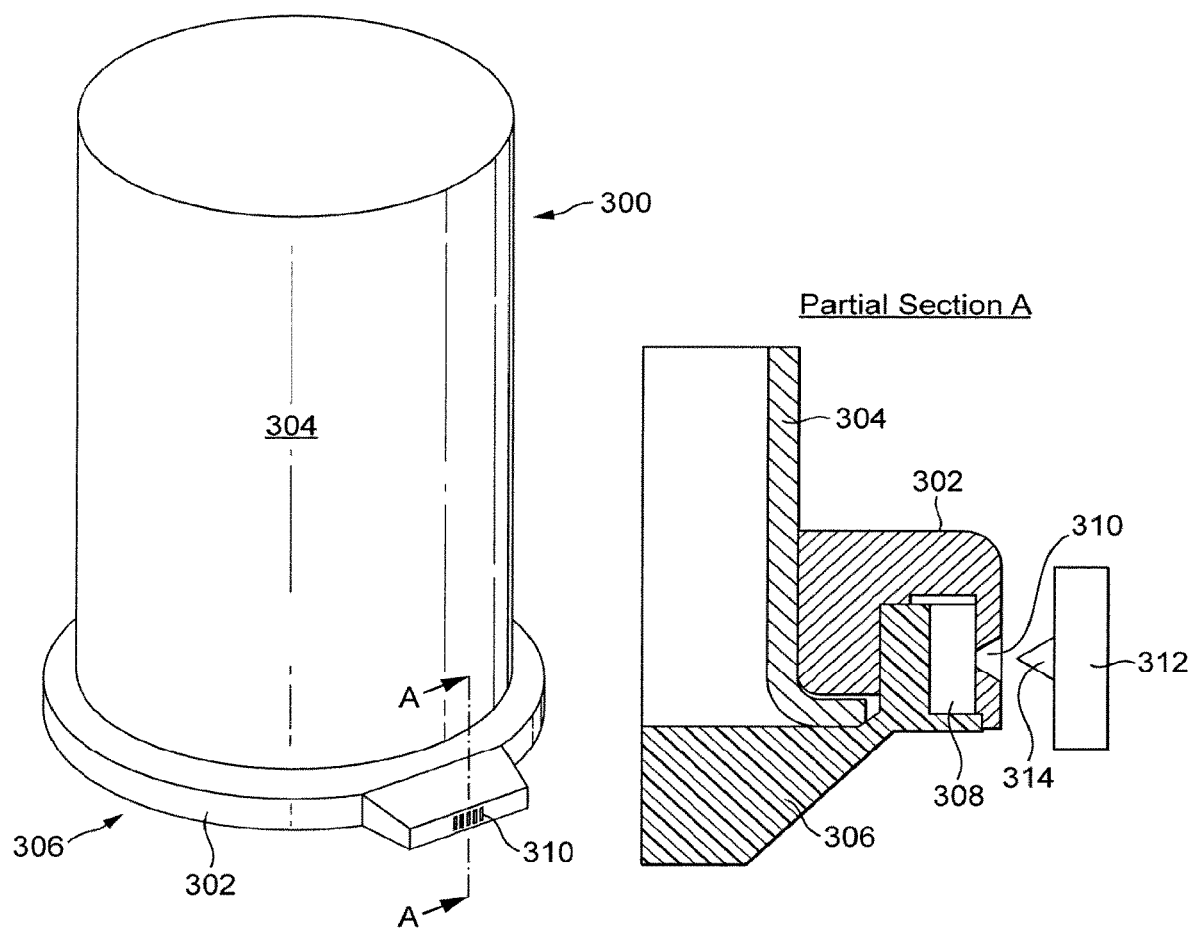
FIG. 3 shows in schematic elevation view, a replaceable fluid container for an engine and a partial section through a wall of the container.

FIG. 3 shows an elevation view of a fluid container 300 and a partial section through a wall of the container 300. The container 300 comprises a body 304, and a base 306. The body 304 is secured to the base by a lip 302. A data provider 308 is carried in the lip 302.

The lip 302 includes a data coupling 310 to enable the data provider 308 to be coupled to an interface 312 for communicating data with an engine control device (not shown in FIG. 3). The interface 312 comprises connectors 314 for connecting the interface 312 with the data provider 308 of the container 300.

The base 306 of the container 300 comprises a fluid coupling (not shown in FIG. 3) for coupling fluid from a reservoir of the fluid container with a fluid circulation system of an engine. The fluid coupling and the data coupling 310 are arranged so that connecting the fluid coupling in fluidic communication with the fluid circulation system of an engine also couples the data provider 308 for data communication with the engine control device via the interface 312 by seating the connectors 314 of the interface in the data coupling 310 on the container 310.

The interface 312 and the connectors 314 provide electrical connections for eight (8) channels which provide measurements for fluid temperature, fluid pressure, fluid quality, fluid type, and the level (e.g. amount) of fluid in the container. The connectors 314 may be arranged to provide electrical power to the data provider 308.

Although the example shown in FIG. 3 comprises conductive electrical connections 314 for communicating with the data provider 308 a contactless connection may also be used. For example, inductive or capacitive coupling can be used to provide contactless communication. One example of inductive coupling is provided by RFID, however other near field communications technology may also be used. Such couplings may enable electrical power to be transferred to the data provider 308, and also have the advantage that the data connection does not require any complex mechanical arrangement and the presence of dirt or grease on the couplings 310, 314 is less likely to inhibit communication with the data provider 308.

The container 300 may comprise a power provider such as a battery for providing electrical power to the data provider 308 this may enable the container 300 to be provided with a range of sensors, including sensors for fluid temperature, pressure and electrical conductivity. Where the container 300 comprises a filter sensors may be arranged to sense these parameters of the fluid as the fluid flows into the filter, and after the fluid has flowed through the filter.

The data provider 308 may be configured to provide information relating to the fluid in the container, for example, where the fluid is oil, the oil grade and/or type. The data provider may also provide data indicating the date on which the container was refilled, a unique serial number of the container, the length of time (e.g. number of hours) for which the container has been used, and whether the container holds new or refilled fluid.

The function of the processors 103, 96 may be provided by any appropriate controller, for example by analogue and/or digital logic, field programmable gate arrays, FPGA, application specific integrated circuits, ASIC, a digital signal processor, DSP, or by software loaded into a programmable general purpose processor. Aspects of the disclosure provide computer program products, and tangible non-transitory media storing instructions to program a processor to perform any one or more of the methods described herein.

Other variations and modifications of the apparatus will be apparent to persons of skill in the art in the context of the present disclosure.

The invention claimed is:

1. A system comprising:
  a vehicle comprising:
    an electric engine,
    a fluid circulation system including a fluid supply line and a fluid return line, and
    an engine control device; and
  a replaceable fluid container comprising:
    a reservoir,
    a heat exchange fluid contained in the reservoir,
    a vent configured to equalize pressure in the reservoir as the heat exchange fluid is drawn into and out from the reservoir;
    a fluid coupling in fluid communication with the reservoir and coupled to the fluid supply line and the fluid return line of the fluid circulation system for respectively drawing the heat exchange fluid out from and into the reservoir, and
    a data provider including a memory for storing data, wherein the data provider is arranged such that positioning the container to permit fluidic communication between the reservoir and the fluid circulation system of the vehicle arranges the data provider for data communication with engine control device.

2. The system of claim 1 wherein the data communication comprises one of: providing data to the engine control device; and receiving data from the engine control device.

3. The system of claim 1 wherein the data provider is arranged to inhibit communication with the engine control device unless the reservoir is in fluidic communication with the fluid circulation system of the engine.

4. The system of claim 1 wherein the data provider is configured such that communication of data with the engine control device is dependent upon the presence of fluidic communication between the fluid container and a fluid circulation system of the engine.

5. The system of claim 1 wherein the fluid coupling comprises a self-sealing coupling arranged such that connecting the self-sealing coupling to the fluid circulation system arranges the data provider for communicating data with the engine control device.

6. The system of claim 1 in which the data provider is configured to communicate with the engine control device in response to the fluid coupling being coupled to the fluid circulation system.

7. The system of claim 1 wherein the container comprises a sensor adapted to sense at least one property of the heat exchange fluid in the reservoir of the container, wherein the data communicated with the engine control device comprises data based on the sensed property of the heat exchange fluid.

8. The system of claim 1 in which the data provider is adapted to receive data from the engine control device and to perform an action selected from the list consisting of:

storing the received data in the memory; and providing data to the engine control device in response to the received data.

9. The system of claim 1, wherein the fluid coupling includes a fluid outlet port coupled to the fluid supply line.

10. The system of claim 9, wherein the fluid coupling includes a fluid inlet port coupled to the fluid return line.

11. The system of claim 1, wherein the heat exchange fluid is a phase change fluid.

12. The system of claim 1, wherein the heat exchange fluid is configured to heat and/or cool the engine.

13. The system of claim 1, wherein the data provider is positioned within the replaceable fluid container.

14. A method of providing a heat exchange fluid to a vehicle, the method comprising:
   connecting a replaceable fluid container to a fluid circulation system of the vehicle, the replaceable fluid container comprising:
      a reservoir containing the heat exchange fluid,
      a vent configured to equalize pressure in the reservoir as the heat exchange fluid is drawn into and out from the reservoir,
      a fluid coupling that connects to a fluid supply line and a fluid return line of the fluid circulation system, and
      a data provider configured to communicate with a control device of the vehicle; and
   drawing the heat exchange fluid out from the reservoir of the replaceable fluid container and into the fluid circulation system of the vehicle through the fluid coupling while gas flows through the vent of the reservoir.

15. The method of claim 14, wherein the vehicle includes an electric engine, and wherein the heat exchange fluid is configured to cool the electric engine.

16. The method of claim 14, wherein the replaceable fluid container includes a data provider configured to communicate with a control device of the vehicle.

17. The method of claim 14, wherein the replaceable fluid container includes a filter.

18. The method of claim 14, wherein the data provider is arranged such that positioning the replaceable fluid container to permit fluidic communication between the reservoir and the fluid circulation system of the vehicle arranges the data provider for data communication with the control device of the vehicle.

19. The method of claim 18, wherein the data provider is arranged to inhibit communication with the control device unless the reservoir is in fluidic communication with the fluid circulation system of the vehicle.

20. The method of claim 14, wherein the fluid coupling includes a fluid outlet port coupled to the fluid supply line.

21. The method of claim 20, wherein the fluid circulation system includes a fluid return line, and wherein the fluid coupling includes a fluid inlet port coupled to the fluid return line.

22. The method of claim 21, further comprising receiving heat exchange fluid through the fluid inlet port.

23. The method of claim 20, further comprising circulating the heat exchange fluid through the reservoir by receiving heat exchange fluid through the fluid inlet port and delivering heat exchange fluid through the outlet port.

* * * * *